No. 843,838. PATENTED FEB. 12, 1907.
H. NEDERMAN.
FOLDING ATTACHMENT FOR SEWING MACHINES.
APPLICATION FILED APR. 26, 1905.

6 SHEETS—SHEET 1.

Fig. I.

Witnesses
Inventor
Herman Nederman.
by Ward Cameron,
Attys.

No. 843,838. PATENTED FEB. 12, 1907.
H. NEDERMAN.
FOLDING ATTACHMENT FOR SEWING MACHINES.
APPLICATION FILED APR. 26, 1905.
6 SHEETS—SHEET 2.
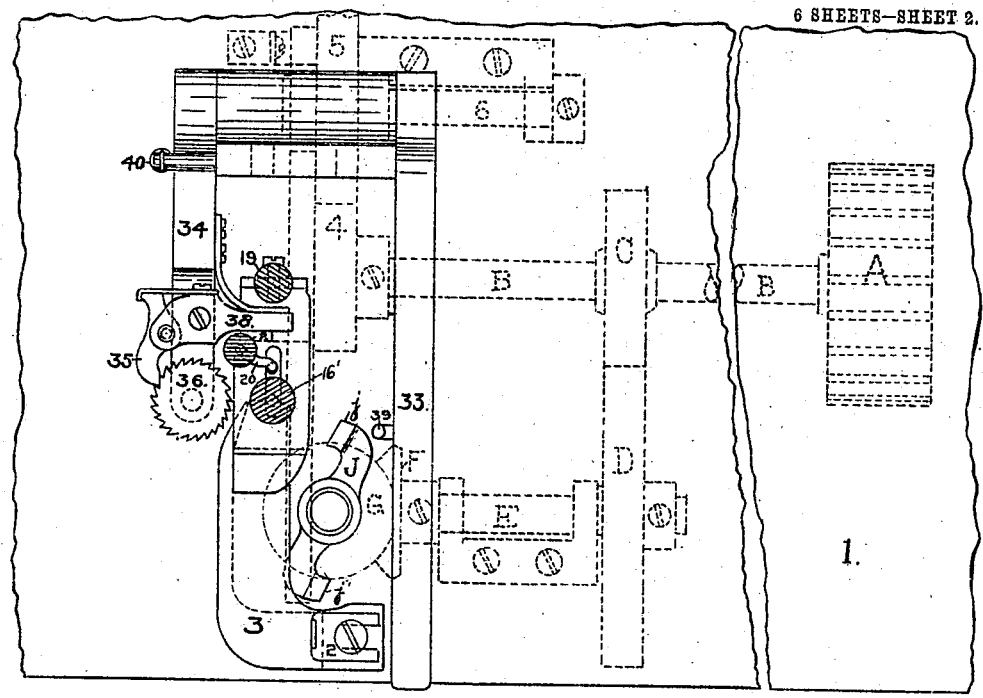
Fig. 2.
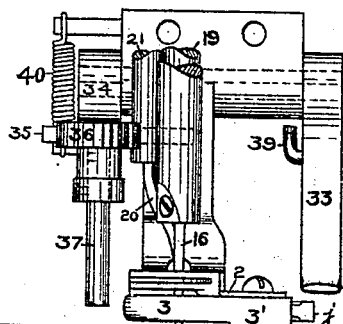
Fig. 3.
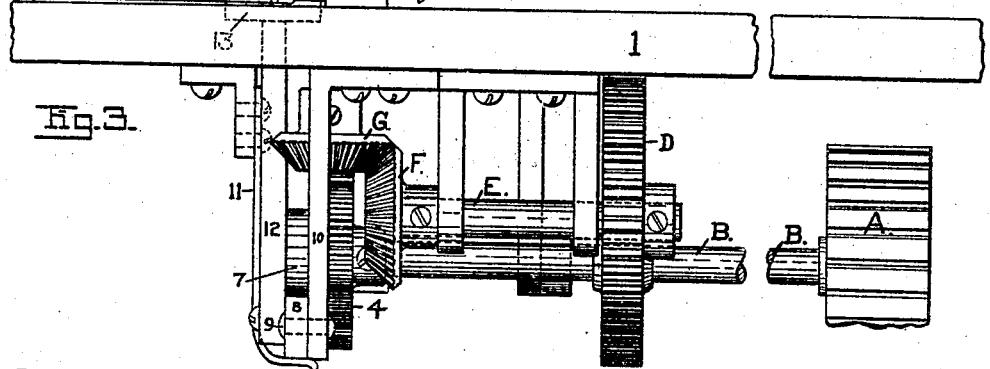
Witnesses
Inventor
Herman Nederman
by Ward Cameron. Attys.

No. 843,838. PATENTED FEB. 12, 1907.
H. NEDERMAN.
FOLDING ATTACHMENT FOR SEWING MACHINES.
APPLICATION FILED APR. 26, 1905.

6 SHEETS—SHEET 3.

Witnesses
Dudley B. Wade
Lottie Prior

Inventor
Herman Nederman
by
Ward & Cameron
Attys

No. 843,838. PATENTED FEB. 12, 1907.
H. NEDERMAN.
FOLDING ATTACHMENT FOR SEWING MACHINES.
APPLICATION FILED APR. 26, 1905.

6 SHEETS—SHEET 4.

Witnesses

Inventor
Herman Nederman
by Ward Cameron,
Attys.

No. 843,838.  
PATENTED FEB. 12, 1907.
H. NEDERMAN.  
FOLDING ATTACHMENT FOR SEWING MACHINES.  
APPLICATION FILED APR. 26, 1905.
6 SHEETS—SHEET 5.
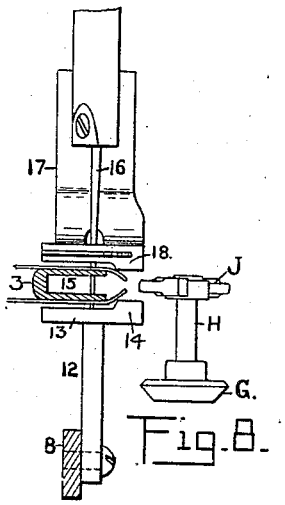
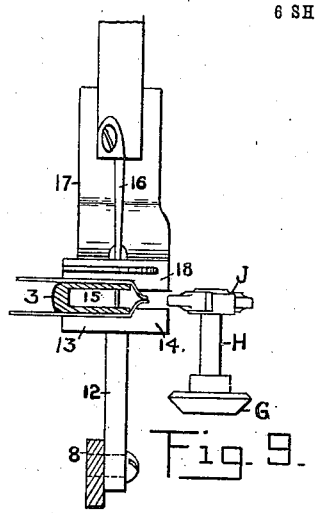
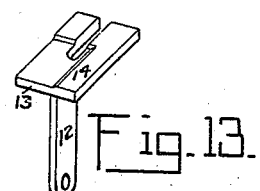
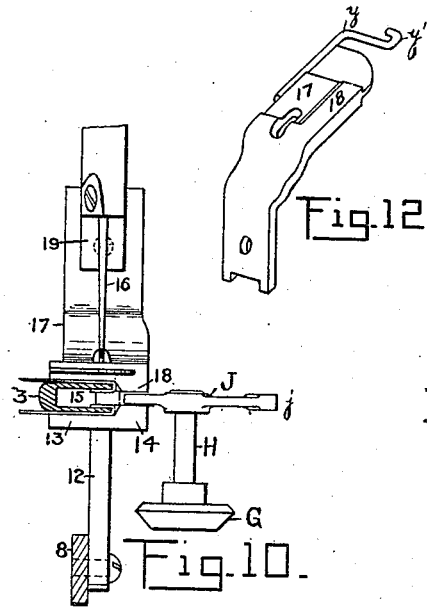
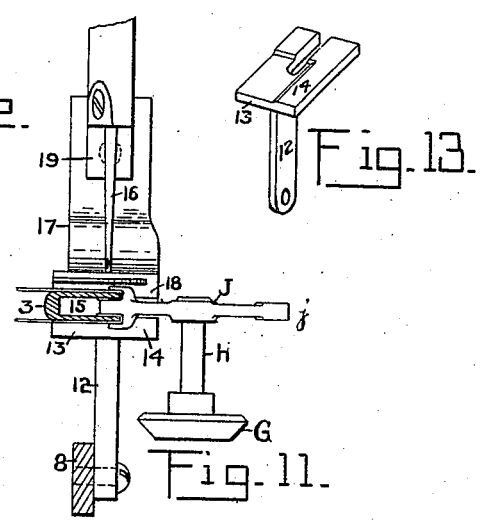
Witnesses  
Inventor  
Herman Nederman,  
by  
Ward Cameron,  
Attys.

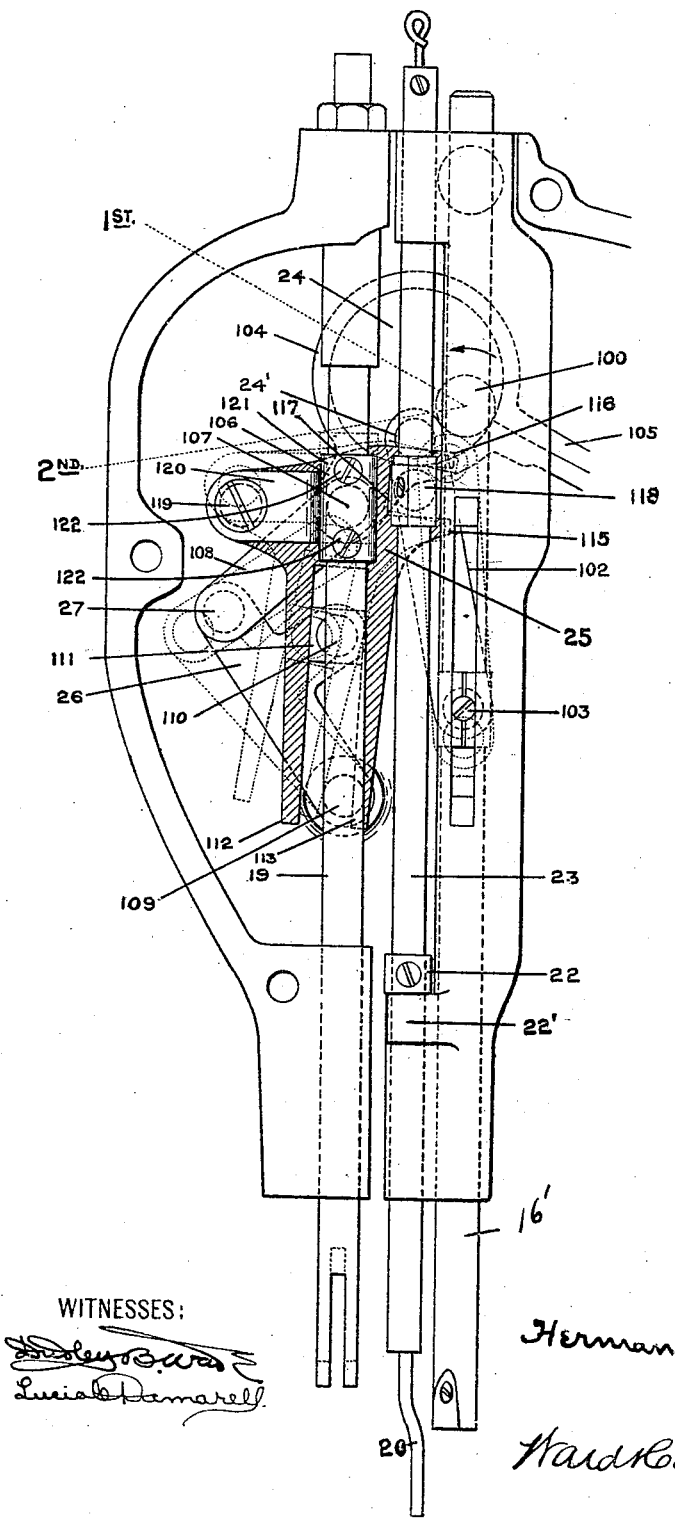

UNITED STATES PATENT OFFICE.

HERMAN NEDERMAN, OF TROY, NEW YORK, ASSIGNOR, BY MESNE ASSIGNMENTS, TO NATIONAL FOLDING & SEWING MACHINE CO., OF TROY, NEW YORK, A CORPORATION.

FOLDING ATTACHMENT FOR SEWING-MACHINES.

No. 843,838.      Specification of Letters Patent.      Patented Feb. 12, 1907.

Application filed April 26, 1905. Serial No. 257,553.

*To all whom it may concern:*

Be it known that I, HERMAN NEDERMAN, a citizen of the United States of America, and a resident of the city of Troy, county of Rensselaer, and State of New York, have invented certain new and useful Improvements in a Folding Attachment for Sewing-Machines, of which the following is a specification.

My invention relates to folding attachments for sewing-machines; and the objects of my invention are to provide a device which may be secured to a sewing-machine, whereby the edges of the goods to be sewed may be automatically turned over and the two or more pieces desired to be united together be so placed and held during the sewing operation that the needle and thread will pass through the pieces and through their turned-over edges, which turned-over portion is placed between the two pieces, respectively, and the seam be uniform and smooth throughout its entire length; also, to provide an attachment whereby the goods may be automatically turned when it is desirable to have the seam sewed around the corners—as, for instance, in making a collar or cuff—and during said turning to cause the seam to be made with the same uniformity and smoothness as when making a straight seam, together with such other elements and combinations as are hereinafter more particularly set forth and claimed. I attain these objects by means of the mechanism illustrated in the accompanying drawings, in which—

Figure 1:
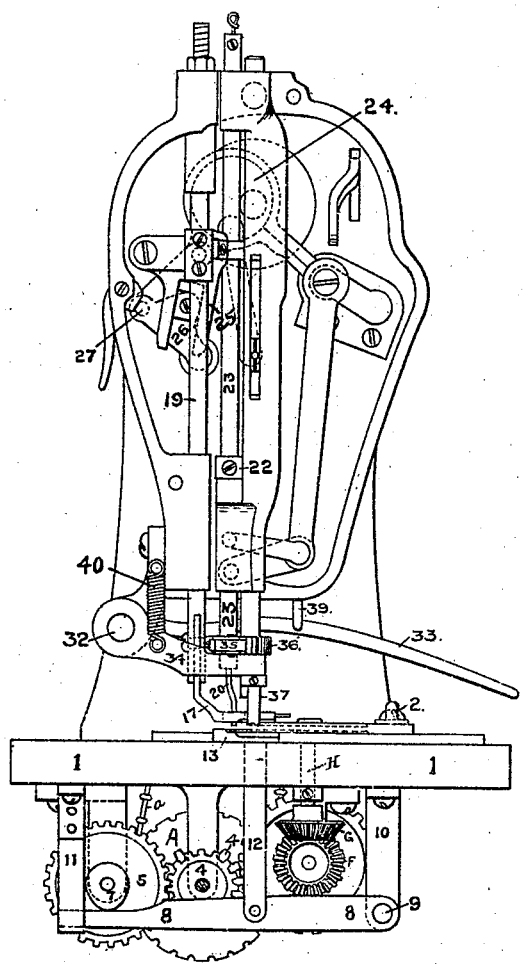
Figure 4:
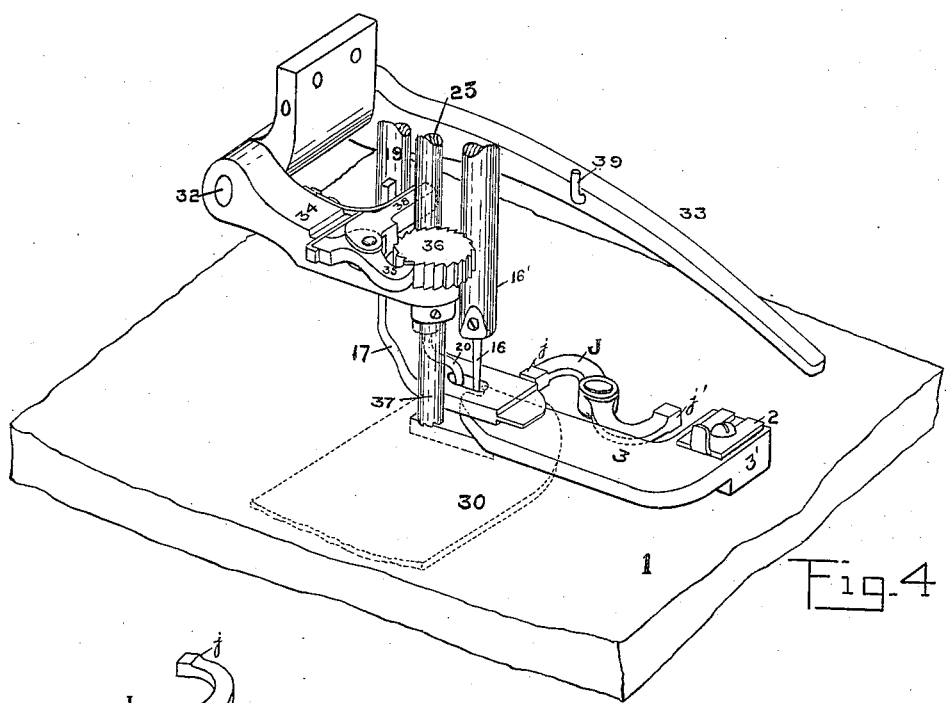
Figure 5:
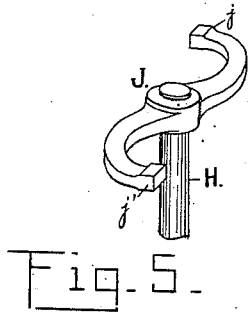
Figure 7:
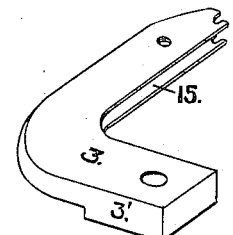
Figure 14:
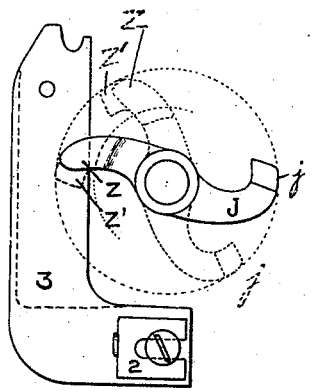
Figure 6:
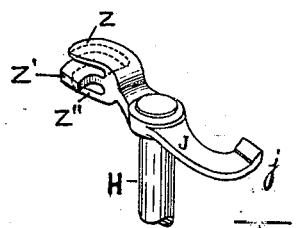

Figure 1 is a side elevation of a sewing-machine to which my attachment is applied. Fig. 2 is a plan of my invention with parts of the sewing-machine to which it is attached shown in section. Fig. 3 is a front elevation of my invention with parts of the machine to which it is attached broken away. Fig. 4 is a perspective view of my invention with parts of the sewing-machine to which it is attached broken away. Fig. 5 is a perspective view of the rotary hook. Fig. 6 is a perspective view of a modified form of rotary hook. Fig. 7 is a perspective view of the fold-guide. Fig. 8 is a detail elevation showing the connection between the goods and the fold-guide and the rotary hook before the goods have been operated on by the two feet of the machine. Fig. 9 is a detail elevation showing the position of the goods when the feet are pressed against them. Fig. 10 is a detail elevation showing the position of the goods when the rotary hook is in contact with the goods. Fig. 11 is a detail elevation showing the position of the goods when a modified form of rotary hook is used. Fig. 12 is a perspective view of the bottom of the upper presser-foot. Fig. 13 is a perspective view of the bottom foot. Fig. 14 is a diagrammatic plan view of the fold-guide and the modified form of rotary hook shown in Fig. 6, illustrating the position of the hook and fold-guide, together with the path of the hook during its rotation. Fig. 15 is a detail side elevation, with parts broken away, showing the connection between the driving mechanism of a sewing-machine and the needle-bar, presser-foot shaft, and walking-foot shaft.

Similar letters refer to similar parts throughout the several views.

My attachment is adapted to be connected with a sewing-machine—such, for instance, as the Wheeler & Wilson, which is the machine shown in the drawings.

Beneath the table 1 of the machine I place a wheel A, which is preferably serrated to engage with the link chain a, Fig. 1, which is attached to the power-pulley of the machine. (Not shown.) The wheel A is secured to the shaft B, which shaft carries the gear-wheel C and also near its end the gear-wheel 4. The gear C meshes with the gear-wheel D, mounted on the shaft E, which shaft has on its end the beveled gear F, which beveled gear F meshes with the beveled gear G on the vertical shaft H, which carries the rotary hook J, the hook J being above the table 1. The gear-wheel 4 on the shaft B, as aforesaid, meshes with the gear 5, which gear 5 is keyed to the shaft 6, on the end of which shaft is the cam 7. (See Fig. 1.) Engaging with the cam 7 is the lever 8, which is pivoted at 9 to the hanger 10, depending from the table 1. The end of the lever 8 near which the cam 7 engages is supported by the spring 11, which spring is secured to the table 1, and about midway between the cam and its pivoted support 9 is a shank 12, on the end of which is formed the bottom foot 13.

The action of the cam 7 on the lever 8 raises and lowers the bottom foot 13, bringing it in contact and removing it away from the work.

On the table 1 I place the fold-guide 3, upon which is preferably arranged an adjustable guide 2. (See Fig. 4.) The fold-guide 3 is slightly raised above the table 1 except at its end 3', where it is attached to the table in order to allow for one or more of the pieces of goods to be sewed to be placed beneath the fold-guide. Along one edge of the fold-guide there is a deep groove 15, into which groove the overlapping portions of the goods to be sewed are forced by the rotary hook, as will hereinafter be more particularly described. The end of the fold-guide is preferably bent or rounded, as shown in Figs. 4 and 7.

The presser-foot 17 is provided with a portion 18, projecting from the surface of the foot, which corresponds with a projection 14 on the top of the foot 13, each being used for the purpose of folding over the ends of the fabric when they are placed on opposite sides of the fold-guide, as shown in Figs. 8 and 9. Presser-foot 17 is secured to the presser-foot shaft 19 in the usual manner.

The needle 16 is secured to the needle-bar 16' in the usual manner.

For the purpose of clearing the goods from the needle and pressing them down after the needle has penetrated them and is about to be withdrawn I have what I call a "walking-foot," which consists of a pin or rod 20, secured to the shaft 23. It is operated in unison with the needle-bar 16'. On the shaft 23 I place a collar 22.

The driving-shaft 100 carries at its end the eccentric 24, which eccentric carries a pin 24', engaging with the link 102, which is connected by a pin to the needle-bar 16' at 103. The eccentric 24 engages with the ring 104, surrounding the eccentric, and which ring has projecting therefrom the arms 105 and 106. The arm 106 engages with the pin 107, connected with the link 108, which link is also connected with the pin 27 on the link 26, pivoted to the frame at 109. The link 26 also carries a pin 110, which engages with movable bearing 111, which movable bearing slides within the arms 112 and 113 of the block 25, which block 25 also has the arms 115 and 116, within which is the movable bearing 117. The pin 118, attached to the walking-foot shaft 23, engages with the movable bearing 117. The block 25 is pivoted at 119 to the projection 120, mounted on the presser-foot shaft 19, by means of the collar 121 and screws 122.

As the eccentric 24 moves in the direction indicated by the arrow in Fig. 15 from the position indicated by the dotted line denominated 1st to the position indicated by the dotted line denominated 2nd the arm 106 on the ring 104 will tend to force downward the pin 107, and therefore the link 108, to the position indicated by dotted lines. The pivot 109 of the link 26 being fastened rigidly to the frame, the movement of the link 108 to the position indicated by dotted lines would cause the end of the link 26 bearing the pin 27, engaging the link 108, to move toward one side of the machine to the position indicated by dotted lines. The link 26 in moving to one side would carry with it the pin 110, which pin 110, engaging the movable bearing 111, sliding within the arms 112 and 113, would cause said arms 112 and 113 to move in a similar direction, as indicated by dotted lines in Fig. 15. The pin 118, attached to the walking-foot shaft 23, being at its lowest point, because of the collar 22 coming into contact with stop 22', said pin 118, engaging movable bearing 117, sliding between the arms 115 and 116, would act as a pivot, which would cause the block 25 to rotate slightly about said pin 118, and thus raise the projection 120 and presser-foot bar 19, as shown by dotted lines in Fig. 15.

The rotary hook J, heretofore referred to, and which is on the shaft H, is for the purpose of forcing the edges of the pieces to be sewed into the groove on the side of the fold-guide, as shown in detail views, Figs. 8, 9, 10, and 11, the location of the hook being such in reference to the fold-guide that as the hook rotates it will enter the groove 15 in the fold-guide, as shown in Figs. 10 and 11.

When the collar 30 is to be made, if it is to be a four-ply collar two of the pieces of which it is to be formed are placed above the fold-guide and the other two pieces beneath it. The fabric would then occupy the position shown in Fig. 8. As the machine starts, the bottom foot raises and the top or presser foot descends in unison. The bottom foot and the top or presser foot bend the goods in contact with them, respectively, on their edges at an angle of ninety degrees, this because the projections 18 and 14 on the two feet respectively press the goods over the edges of the fold-guide, and they occupy the position shown in Fig. 9. The rotary hook then is inserted in the groove 15 of the holder and presses the edges of the goods therein, as shown in Fig. 10, thus overlapping the edges. The needle 16 is then inserted, and the seam is sewed in the usual way It is noticed that the rotary hook presses the edges into the fold-guide just in front of the needle, so that the goods pass immediately to the needle and are sewed without giving any opportunity for the goods to become loosened or out of position between the time they are folded and the actual sewing thereof.

I have shown in Figs. 6 and 11 a modified form of rotary hook, providing on one of the ends of the hook two parallel portions Z and Z'', with hooked portion Z' placed between and separated from them, so arranged that the portion Z' will enter the grooves 15 in the fold-guide, while the portions Z and Z" will engage the work above and below the fold-guide, respectively, and tend to smooth the folded edge.

Fig. 14 illustrates by the dotted circular lines the path of the rotary hook, the inner curved dotted line showing that the overlapping pieces Z and Z" do not interfere with the operations of the hook by striking the fold-guide 3.

I also preferably arrange on the end of the presser-foot 17 a right-angled projecting wire Y, (see Fig. 12,) which has at its loose end a projection Y', which wire and projection act as a guide and assists in maintaining the proper position of the goods in reference to the presser-foot.

For the purpose of automatically turning the goods and maintaining the operation of sewing the same without interruption I have constructed the following device: Secured to the frame of the machine, in the rear of the presser-foot shaft 19, I pivot a spindle 32, upon one end of which is placed a lever 33, the other end carrying a plate 34, upon which is arranged a dog 35, engaging with the ratchet 36, which is placed on the end of a vertical post 37. The dog 35 is connected with the lever 38, the shank of which lever is adapted to be brought in contact with the walking-foot shaft 23. When the lever is depressed, the movement of the walking-foot shaft would impart movement to the dog and cause the ratchet to move one space with each movement of the walking-foot. This will impart to the goods with which the roughened or serrated end of the post 37 engages when the lever 33 is depressed a rotary motion in step with the feeding and stitch-producing motion of the sewing-machine. Thus with each stitch made as the needle leaves the work and the walking-foot engages with it the post 37 turns the work just sufficient in extent and time to allow the needle on its return to make its uniform stitch, and the goods while the stitch is being made to be held securely in position, and when the needle leaves the work the goods are given just the required turn and stopped again to hold the work securely while the needle is making the stitch. This is a very important part of the invention, as it is apparent that if the goods are fed too fast on the turn there would be a wrinkling or unevenness in the seam, and there would be a tendency to break the threads and to cause the seam to be constructed in an irregular rather than a uniform manner. As soon as the corner is turned the lever is lifted and the goods are sewed along a straight line, as before. On the lever 33 I place a stop 39, (see Figs. 1 and 4,) which will engage the frame of the machine under the influence of the spring 40. Said stop 39 thus holds the lever against the tension of the said spring, as shown in Fig. 1, when the lever is out of commission.

What I claim as my invention, and desire to secure by Letters Patent, is—

1. A device for folding over the edges of fabric to be stitched, consisting of a fold-guide, means coöperating therewith for folding the fabric, said means including a rotary hook; a means for causing said hook to rotate and in its rotation to press the edges of the goods into said fold-guide, substantially as described.

2. An attachment for sewing-machines, consisting of a fold-guide provided with an opening along one edge means coöperating therewith for folding the fabric, said means including a rotary hook; a means for imparting motion to said hook; said hook in its rotation forcing the edges of the goods into said opening in the edge of said fold-guide, substantially as described.

3. An attachment for sewing-machines, consisting of a fold-guide secured to the table of a sewing-machine; a bottom foot beneath the work; a means for causing said bottom foot to raise and lower in unison with the respectively lowering and raising of the presser-foot; a projection on the operating-surface of the bottom foot, near one edge thereof; a presser-foot; a projection along the operating-surface near one edge thereof; a rotary hook with means for imparting motion to said hook, all substantially as described.

4. An attachment for sewing-machines, consisting of a fold-guide, means coöperating therewith for folding the fabric; a vertical post; a pivoted lever carrying said post; a ratchet on the end of said post; a dog engaging said ratchet; a lever connected with said dog, engaging a shaft; a means for imparting motion to said post corresponding to the feed motion of the machine; a lever by the operation of which said post is brought in contact with the work on the table of the machine, all substantially as described.

5. In a sewing-machine attachment; a fold-guide, means coöperating therewith for folding the fabric; a feeding mechanism; a device for turning the goods, consisting of a post having one end engaging with the goods to be operated upon; a ratchet attached to the other end of said post; a dog arranged to engage said ratchet; a pivoted lever supporting said post, ratchet and dog; a lever for operating said post; a means for imparting motion to said dog, whereby the dog will move the ratchet, and therefore, the post, in unison with the feed motion of the machine.

6. In an attachment for sewing-machines; a shaft; a means for applying power thereto; a series of gears operated by the movement of said shaft; beveled gears; a rotary hook set in motion by said gears; a fold-guide provided with a groove along one edge thereof secured to the table of a sewing-machine, means coöperating therewith for folding the fabric, said means including said rotary hook, substantially as described.

7. In an attachment for sewing-machines; a fold-guide, means coöperating therewith for folding the fabric; a shaft; means for applying power thereto; gears on said shaft; a gear with which one of said last-mentioned gears engages; a shaft; a cam thereon; a lever with which said cam engages; said coöperating means including a bottom foot; a spring holding said lever in contact with said cam.

8. In an attachment for sewing-machines; a fold-guide provided with an opening along one edge thereof; means for turning the edges of the material to be sewed over said fold-guide; a rotary hook, a means for causing said hook in its rotation to press said folded-over edges in the opening in said fold-guide; a walking-foot arranged to engage said material; and hold the same as the needle of the machine is withdrawn therefrom; all substantially as described.

Signed at Albany, New York, this 18th day of April, 1905.

HERMAN NEDERMAN.

Witnesses:
J. H. BRODERICK,
FREDERICK W. CAMERON